(12) United States Patent
Kim et al.

(10) Patent No.: US 8,818,114 B2
(45) Date of Patent: Aug. 26, 2014

(54) METHOD AND APPARATUS FOR IMAGE ENCODING/DECODING

(75) Inventors: Hayoon Kim, Seongnam-si (KR); Haekwang Kim, Seoul (KR); Joohee Moon, Seoul (KR); Yunglyul Lee, Seoul (KR); Byeungwoo Jeon, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 540 days.

(21) Appl. No.: 13/122,123

(22) PCT Filed: Sep. 24, 2009

(86) PCT No.: PCT/KR2009/005462
§ 371 (c)(1),
(2), (4) Date: Mar. 31, 2011

(87) PCT Pub. No.: WO2010/038951
PCT Pub. Date: Apr. 8, 2010

(65) Prior Publication Data
US 2011/0182523 A1    Jul. 28, 2011

(30) Foreign Application Priority Data
Oct. 1, 2008  (KR) .......................... 10-2008-0096356

(51) Int. Cl.
*G06K 9/36* (2006.01)
*H04N 7/34* (2006.01)

(52) U.S. Cl.
CPC ..................................... *H04N 7/345* (2013.01)
USPC ......................................................... 382/232

(58) Field of Classification Search
None
See application file for complete search history.

(56) References Cited

U.S. PATENT DOCUMENTS

| 7,095,896 | B2 * | 8/2006 | Abe et al. ........................ 382/233 |
| 8,135,064 | B2 * | 3/2012 | Tasaka et al. ............. 375/240.16 |
| 8,244,050 | B2 * | 8/2012 | Kim ................................ 382/238 |
| 2003/0231795 | A1 | 12/2003 | Karczewicz |
| 2005/0147165 | A1 * | 7/2005 | Yoo et al. ................. 375/240.14 |
| 2005/0259877 | A1 | 11/2005 | Wang et al. |
| 2005/0265447 | A1 * | 12/2005 | Park .......................... 375/240.03 |
| 2006/0104354 | A1 | 5/2006 | Han et al. |
| 2009/0028241 | A1 * | 1/2009 | Takahashi et al. ........ 375/240.12 |

OTHER PUBLICATIONS

International Search Report mailed Apr. 28, 2010 for PCT/KR2009/005462.

* cited by examiner

*Primary Examiner* — Vikkram Bali
(74) *Attorney, Agent, or Firm* — Lowe Hauptman & Ham, LLP

(57) ABSTRACT

A method and an apparatus for image encoding/decoding are disclosed. The apparatus includes: a block decomposer for decomposing a current block into a plurality of sub-blocks; and an intra prediction encoder for performing an intra prediction encoding by referring to already encoded and decoded adjacent pixel information of each sub-block, based on an intra prediction mode equal to an intra prediction mode of the current block, thereby generating a bit stream for the current block. In image encoding and image decoding, when a current block to be encoded or decoded is predicted, the disclosed method and apparatus can improve the accuracy of the prediction, which can provide an image with a satisfactory reproduction quality by improved coding efficiency.

3 Claims, 15 Drawing Sheets

METHOD AND APPARATUS FOR IMAGE ENCODING/DECODING

CROSS REFERENCE TO RELATED APPLICATION

This application claims the priority of Korean Patent Application No. 10-2008-0096356, filed on Oct. 1, 2008, in the KIPO (Korean Intellectual Property Office), the disclosure of which is incorporated herein in their entirety by reference. Further, this application is the National Phase application of International Application No. PCT/KR2009/005462, filed Sep. 24, 2009, which designates the United States and was published in Korean. Each of these applications is hereby incorporated by reference in their entirety into the present application.

TECHNICAL FIELD

The present disclosure relates to a method and apparatus for image encoding/decoding. More particularly, the present disclosure relates to an image encoding/decoding method and apparatus, which can improve the accuracy of a prediction on a current block to be encoded or decoded in image encoding/decoding, thereby providing a satisfactory image reproduction quality by improved coding efficiency.

BACKGROUND ART

The statements in this section merely provide background information related to the present disclosure and may not constitute prior art.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264. Such H.264/AVC (hereinafter referred to as 'H.264') uses a spatial predictive coding method, which is different from conventional video coding-related international standards such as MPEG-1, MPEG-2, MPEG-4 Part2 Visual and the like.

Conventional video coding methods use "intra prediction" for coefficients transformed in discrete cosine transform domain (or DCT transform domain) to seek higher encoding efficiency, resulting in degradation of the subjective video quality at low band transmission bit rates. However, H.264 adopts a method of encoding based on a spatial intra prediction in a spatial domain rather than in a transform domain.

An encoder using an encoding method based on the conventional spatial intra prediction predicts pixels of a block to currently encode from pixels in the previous blocks that have already undergone encoding and having been reproduced, encodes just the differences of the predicted block pixel values from pixel values of the actual block, and transmits the encoded difference information to a decoder. At this time, the encoder may either transmit parameters needed for prediction to the decoder or previously share the parameters needed for prediction with the decoder, so as to enable the decoder to predict the current block. Meanwhile, the decoder predicts information of a desired current block to be currently decoded by using information of neighbor blocks already decoded and reproduced, and reconstructs and reproduces the desired current block based on a sum of the predicted information and the difference information transmitted from the encoder. At this time also, if the decoder has received parameters need for the prediction from the encoder, the decoder uses the received parameters in predicting and decoding the current block.

However, in a prediction using the intra prediction according to the conventional video coding and video decoding, pixels of a current block to be currently encoded are predicted by referring to the already reconstructed information of adjacent pixels within a neighbor block around the current block (usually a block located at the left or above the current block). Here, the pixels of the current block to be encoded and the adjacent pixels of the neighbor block referred to in order to predict the current block may be spaced apart from each other by a considerably long distance. At this time, the accuracy of the prediction may be degraded too much, which may lower the quality of video encoding. As a result, the low quality video encoding may yield an unsatisfactory reproduction state when the image encoded with the low quality is restored and reproduced.

DISCLOSURE

Technical Problem

Therefore, the present disclosure has been made in an effort to improve the accuracy of prediction on a current block to be encoded or decoded in encoding or decoding an image, and thus provide a satisfactory image reproduction quality for the image by improved coding efficiency.

Technical Solution

One aspect of the present disclosure provides an apparatus for encoding an image, including: a block decomposer for decomposing a current block into a plurality of sub-blocks; and an intra prediction encoder for performing an intra prediction encoding by referring to already encoded and decoded adjacent pixel information of each sub-block, based on an intra prediction mode equal to an intra prediction mode of the current block, thereby generating a bit stream for the current block.

Another aspect of the present disclosure provides a method of encoding an image, including: decomposing a current block into a plurality of sub-blocks; and generating a bit stream for the current block by performing an intra prediction encoding by referring to already encoded and decoded adjacent pixel information of each sub-block, based on an intra prediction mode equal to an intra prediction mode of the current block.

Yet another aspect of the present disclosure provides an apparatus for decoding an image, including: a decoder for decoding a received bit stream, so as to extract residual sub-blocks and an intra prediction mode for a plurality of sub-blocks decomposed from a current block; a dequantizer for dequantizing the extracted residual sub-block; an inverse transform unit for performing an inverse transform on the dequantized residual sub-block; an intra predictor for performing an intra prediction according to the intra prediction mode with reference to adjacent pixel information for each sub-block already decoded and reconstructed, thereby generating predicted sub-blocks for the plurality of sub-blocks; an adder for adding the inverse-transformed residual sub-blocks and the predicted sub-blocks to reconstruct the plurality of sub-blocks; and a block combiner for reconstructing the current block by scanning the plurality of reconstructed sub-blocks according to a sequence of a zigzag sequence, wherein the intra prediction mode for the plurality of sub-blocks is equal to an intra prediction mode of the current block.

Yet another aspect of the present disclosure provides a method of decoding an image, including: decoding a received bit stream, so as to extract residual sub-blocks and an intra prediction mode for a plurality of sub-blocks decomposed from a current block; dequantizing the extracted residual sub-block; performing an inverse transform on the dequantized residual sub-block; generating predicted sub-blocks for the plurality of sub-blocks by performing an intra prediction according to the intra prediction mode with reference to adjacent pixel information for each sub-block already decoded and reconstructed; reconstructing the plurality of sub-blocks by adding the inverse-transformed residual sub-blocks and the predicted sub-blocks; and restoring the current block by scanning the plurality of reconstructed sub-blocks according to a sequence of a zigzag sequence, wherein the intra prediction mode for the plurality of sub-blocks is equal to an intra prediction mode of the current block.

Advantageous Effects

In image encoding and image decoding according to an embodiment of the present disclosure, when a current block to be encoded or decoded is predicted, the current block is decomposed into sub-blocks and each of the sub-blocks is then intra-predicted by referring to adjacent pixel information of pixels adjacent to the corresponding sub-block, instead of performing an intra prediction on each decomposed sub-block by referring to adjacent pixel information of surrounding blocks adjacent to the current block. As a result, the image encoding method and image decoding method according to the present disclosure can improve the accuracy of the prediction, which can provide an image with a satisfactory reproduction quality by improved coding efficiency.

DESCRIPTION OF DRAWINGS

FIG. 3 illustrates an example of a current block and a plurality of sub-blocks decomposed from the current block for application of an image encoding method according to an embodiment of the present disclosure;

FIG. 4 illustrates an example of an intra prediction encoding of a plurality of sub-blocks according to a sequence of a raster scan when the intra prediction mode of the current block is a horizontal mode;

FIG. 5 illustrates an example of an intra prediction encoding of a plurality of sub-blocks according to a sequence of a raster scan when the intra prediction mode of the current block is a vertical mode;

FIG. 6 illustrates an example of an intra prediction encoding of a plurality of sub-blocks according to a sequence of a raster scan when the intra prediction mode of the current block is a DC mode;

FIG. 7 illustrates an example of an intra prediction encoding of a plurality of sub-blocks according to a zigzag sequence when the intra prediction mode of the current block is a horizontal mode;

FIG. 9 illustrates an example of an intra prediction encoding of a plurality of sub-blocks according to a zigzag sequence when the intra prediction mode of the current block is a DC mode;

FIGS. 12A and 10B are views illustrating an example of a process of performing an intra prediction on one sub-block in a DC mode;

MODE FOR INVENTION

Figure 1:
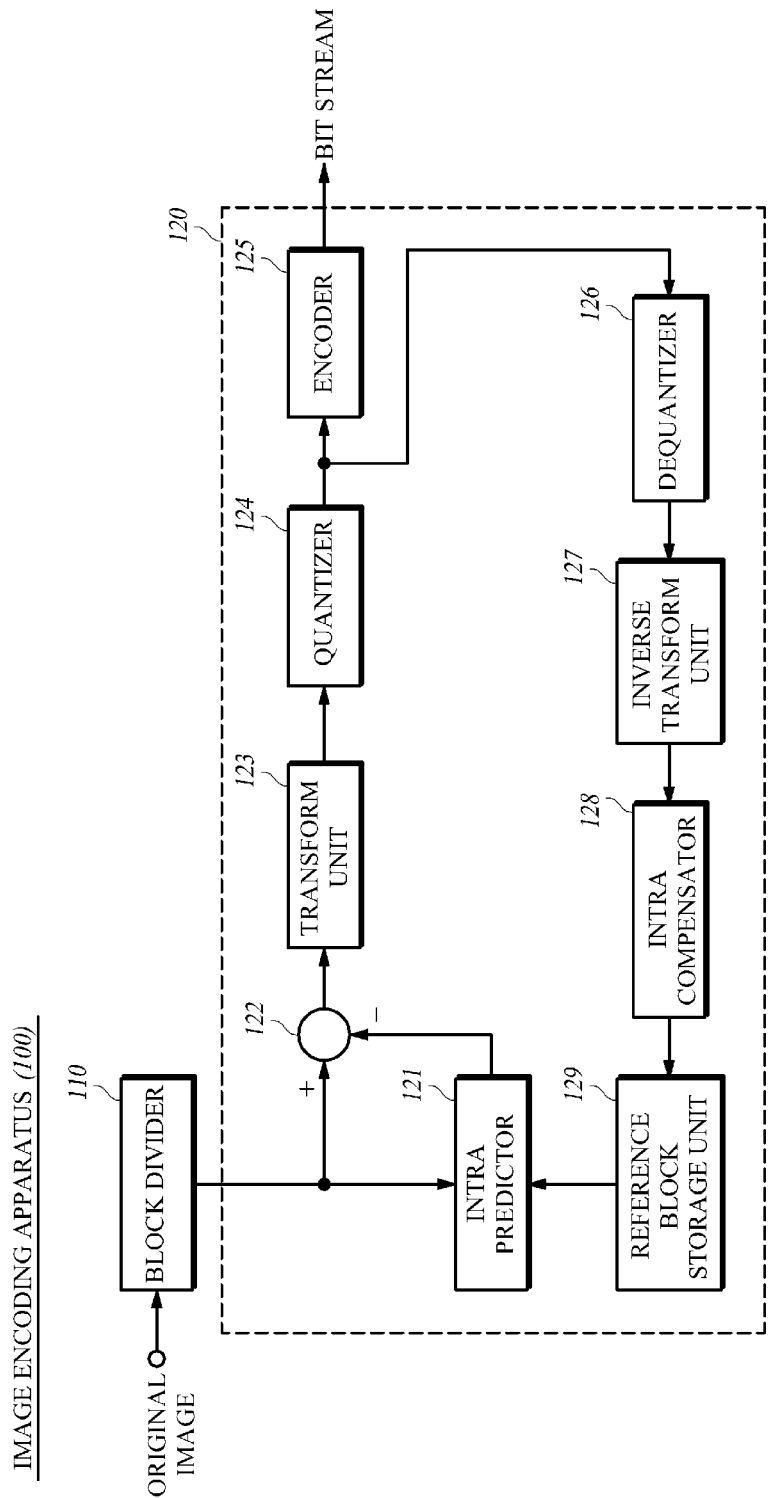
FIG. 1 is a schematic block diagram of an image encoding apparatus according to an aspect of the present disclosure.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a schematic block diagram of an image encoding apparatus 100 according to an aspect of the present disclosure.

Referring to FIG. 1, the image encoding apparatus 100 according to an aspect of the present disclosure includes a block decomposer 110 for decomposing a current block to be encoded in an input original image into a plurality of sub-blocks, and an intra prediction encoder 120 for generating a bit stream for the current block by performing an intra prediction encoding by referring to already encoded or decoded adjacent pixel information of each sub-block.

The block decomposer 110 may divide the current block into multiple sub-blocks based on the unit of frequency conversion.

Referring to FIG. 1, the intra prediction encoder 120 includes: an intra predictor 121 for selecting one sub-block among a plurality of sub-blocks according to a sequence of a raster scan or a zigzag sequence, and generating a predicted sub-block by performing an intra prediction for the selected sub-block with reference to adjacent pixel information of each corresponding sub-block based on an intra prediction mode equal to the intra prediction mode of the current block; a subtractor 122 for generating a residual sub-block by calculating a difference between the selected single sub-block and a corresponding predicted sub-block; a transform unit 123 for performing a Discrete Cosine Transform (DCT) on the generated residual sub-block; a quantizer 124 for quantizing the transformed residual sub-block; and an encoder 125 for encoding the quantized residual sub-block. Here, each of the divided sub-blocks is a transform-based block in the transform unit 123, and may be a frequency transform-based block.

The sequence in which a plurality of sub-blocks are intra-prediction-encoded may be a sequence of a raster scan or a zigzag sequence. It may be more efficient to perform the intra-prediction-encoding by selecting one sub-block from a plurality of sub-blocks according to the sequence of a raster scan than the zigzag sequence. Although only two cases including the sequence of a raster scan and the zigzag sequence are discussed as the sequences by which a plurality of sub-blocks can be intra-prediction-encoded in the present disclosure, it is also possible to change the sequence according to the characteristic of the image.

The transform unit 123 described above may perform a Discrete Cosine Transform (DCT). The encoder 125 described above may perform an entropy encoding, in which the length of a code indicating a symbol changes according to the probability that the symbol occurs.

The intra prediction encoder 120 described above may further include a dequantizer 126 for dequantizing a quantized residual sub-block; an inverse transform unit 127 for performing an inverse transform on the dequantized residual sub-block; an intra-compensator 128 for performing an intra-compensation on the inverse-transformed residual sub-block, thereby generating a reference block; and a reference block storage unit 129 for storing the generated reference block.

The reference blocks stored in the reference block storage unit 129 described above contain adjacent pixel information of each sub-block, which will be referred to when an intra prediction is performed for a sub-block to be selected after the single sub-block selected from multiple sub-blocks according to the sequence of a raster scan or the zigzag sequence.

The intra prediction mode of the current block mentioned above may be, for example, one of a vertical mode, a horizontal mode, and a Direct Current (DC) mode in the 16×16 intra prediction mode.

The intra prediction of each sub-block employs the same intra prediction mode as the intra prediction mode of the current block. For example, based on an assumption that the current block is a 16×16 block and each of the sub-blocks decomposed from the current block is a 4×4 block, when the 16×16 intra prediction mode for the current block is a vertical mode, the 4×4 intra prediction mode for each sub-block is also a vertical mode. Further, when the 16×16 intra prediction mode for the current block is a horizontal mode, the 4×4 intra prediction mode for each sub-block is also a horizontal mode. When the 16×16 intra prediction mode for the current block is a DC mode, the 4×4 intra prediction mode for each sub-block is also a DC mode.

Figure 2:
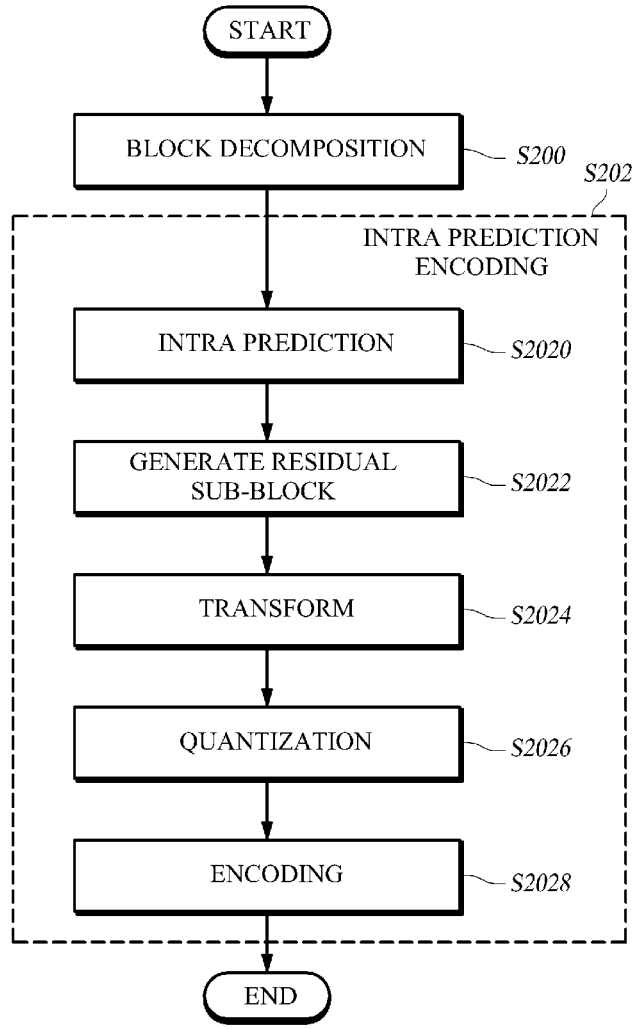
FIG. 2 is a flowchart of an image encoding according to an embodiment of the present disclosure.

FIG. 2 is a flowchart of an image encoding according to an embodiment of the present disclosure.

Referring to FIG. 2, an image encoding method performed by an image encoding apparatus 100 according to an embodiment of the present disclosure includes: a block decomposing step (S200) of decomposing a current block to be encoded in an input original image into a plurality of sub-blocks; and an intra prediction encoding step (S202) of generating a bit stream for the current block by performing an intra prediction encoding by referring to reference pixel information for each sub-block already encoded and decoded.

The intra prediction encoding step (S202) may include: a step (S2020) of selecting a single sub-block among a plurality of sub-blocks according to a sequence of a raster scan or a zigzag sequence, and generating a predicted sub-block by performing an intra prediction for the selected single sub-block with reference to adjacent pixel information of each corresponding sub-block based on an intra prediction mode equal to the intra prediction mode of the current block; a step (S2022) of generating a residual sub-block by calculating a difference between the selected single sub-block and a corresponding predicted sub-block; a step (S2024) of transforming the generated residual sub-block; a step (S2026) of quantizing the transformed residual sub-block; and a step (S2028) of encoding the quantized residual sub-block.

After the quantization step (S2026), the intra prediction encoding step (S202) may further include the steps of: dequantizing a quantized residual sub-block; performing an inverse transform on the dequantized residual sub-block; performing an intra-compensation on the inverse-transformed residual sub-block, thereby generating a reference block; and storing the generated reference block. Those further included steps are performed in parallel with the intra prediction step (S2020), the residual sub-block generating step (S2022), the transform step (S2024), the quantization step (S2026), and the encoding step (S2028). That is to say, the steps added in order to generate and store the reference block may be simultaneously performed with the intra prediction encoding process for the sub-block.

In order to apply the image encoding method according an embodiment of the present disclosure as described above, an original image is decomposed into Macro Blocks (MBs) each having a predetermined size. In the present disclosure, the decomposed macro block is called a "current block".

Further, in the image encoding method according an embodiment of the present disclosure, a current block, which is a 16×16 macro block, is decomposed into a plurality of Sub-Blocks (SBs), each of which is a basic unit in the intra prediction encoding. Further, each sub-block includes a plurality of pixels, and each pixel contains information of a corresponding part in the original image.

The current block, sub-block, and pixel as described above will now be described again with reference to FIG. 3 showing an example of a 16×16 block.

Figure 3:
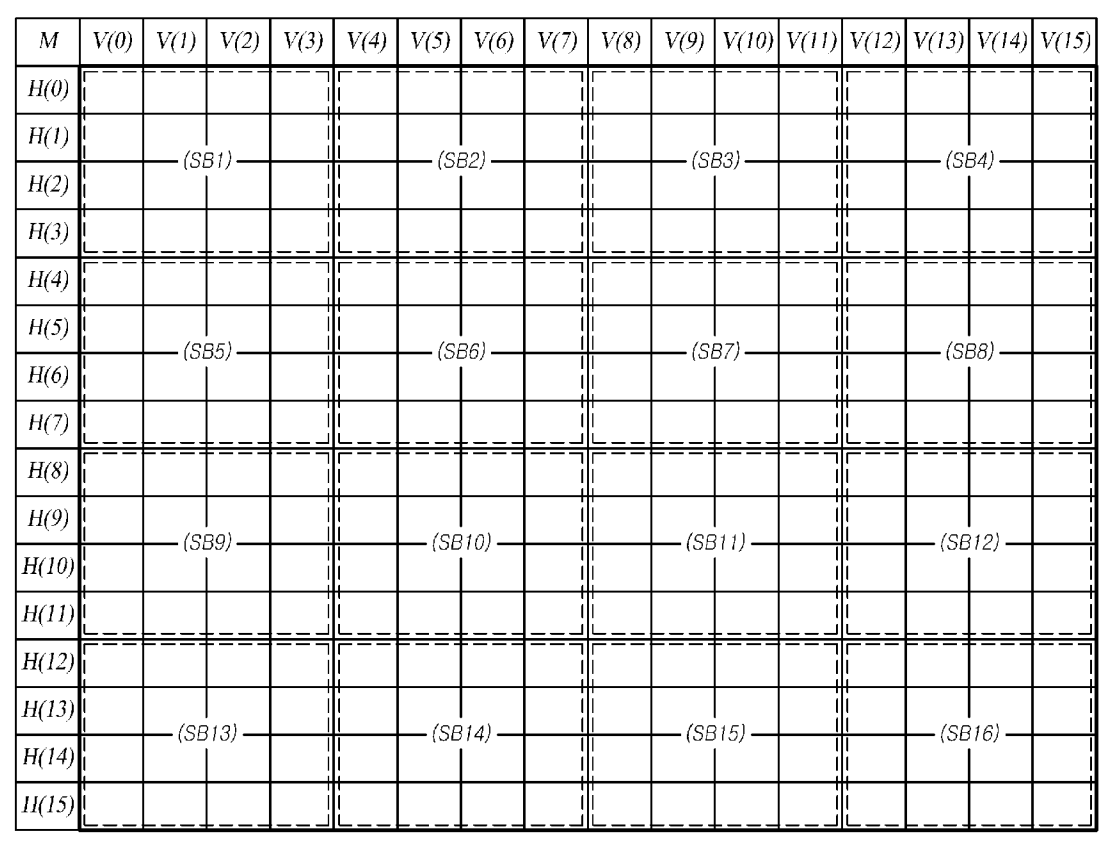

FIG. 3 illustrates an example of a current block and a plurality of sub-blocks decomposed from the current block for the application of an image encoding method according an embodiment of the present disclosure.

In FIG. 3, a current block applied to an image encoding according an embodiment of the present disclosure is a 16×16 macro block, which is identified by a box having a contour defined by a thick solid line.

Further, in FIG. 3, the current block, which is a 16×16 macro block defined by a thick solid line, is decomposed into 16 sub-blocks each having a 4×4 block size. The 16 decomposed sub-blocks are named "SB 1, SB 2, SB 3, . . . , and SB 16" and are indicated by boxes defined by broken lines.

Referring to FIG. 3, each sub-block includes 16 pixels, and each pixel contains information on the image.

In FIG. 3, V(0) to V(15) and H(0) to H(15) correspond to pixel information on adjacent macro blocks of the current block (macro block), and the pixel information on the adjacent macro blocks correspond to pixel information of already encoded and decoded macro blocks.

By using the current block including the 16 sub-blocks (SB 1, SB 2, SB 3, . . . , and SB 16) illustrated as an example in FIG. 3, an image encoding according to an embodiment of the present disclosure will now be described with reference to FIGS. 1 and 2.

In an image encoding according to an embodiment of the present disclosure, a current block having a 16×16 block size is decomposed into 16 sub-blocks (SB 1, SB 2, SB 3, . . . , and SB 16), and an intra prediction encoding is then performed for each of the sub-blocks according to a predetermined sequence. Here, the predetermined sequence may be a sequence of a raster scan or a zigzag sequence.

In other words, the 16 sub-blocks are scanned according to a sequence of a raster scan or a zigzag sequence, and an intra prediction encoding is then performed for a first sub-block among the scanned sub-blocks. Then, a next sub-block is determined among the 16 sub-blocks scanned according to the sequence of a raster scan or the zigzag sequence, and an intra prediction encoding is then performed for the next sub-block. Thereafter, the other sub-blocks are also subjected to the intra prediction encoding according to the sequence of a raster scan or the zigzag sequence. After the intra prediction encoding is completely performed for all the decomposed sub-blocks, a bit stream for the current block is generated by using the result of the intra prediction encoding for each sub-block.

The intra prediction encoding described above corresponds to a process performed for each sub-block, and may include a series of steps including an intra prediction, a transform, a quantization, and an encoding.

In the intra prediction step included in the intra prediction encoding performed for each sub-block, an intra prediction mode is selected for the intra prediction. In the present disclosure, the same intra prediction mode as the intra prediction mode of the current block is selected as an intra prediction mode for each sub-block.

For example, when the intra prediction mode of the current block is a horizontal mode, the intra prediction mode of the decomposed sub-blocks is also a horizontal mode. When the intra prediction mode of the current block is a vertical mode, the intra prediction mode of the decomposed sub-blocks is also a vertical mode. Also, when the intra prediction mode of the current block is a DC mode, the intra prediction mode of the decomposed sub-blocks is also a DC mode.

An image encoding through an intra prediction encoding of each sub-block when the intra prediction mode of the current block is a horizontal mode will be described in detail with reference to FIGS. 4 and 7, an image encoding through an intra prediction encoding of each sub-block when the intra prediction mode of the current block is a vertical mode will be described in detail with reference to FIGS. 5 and 8, and an image encoding through an intra prediction encoding of each sub-block when the intra prediction mode of the current block is a DC mode will be described in detail with reference to FIGS. 6 and 9. In the meantime, the intra prediction encoding shown in FIGS. 4, 5, and 6 corresponds to an intra prediction encoding according to a sequence of a raster scan, while the intra prediction encoding shown in FIGS. 7, 8, and 9 corresponds to an intra prediction encoding according to a zigzag sequence.

Figure 4:
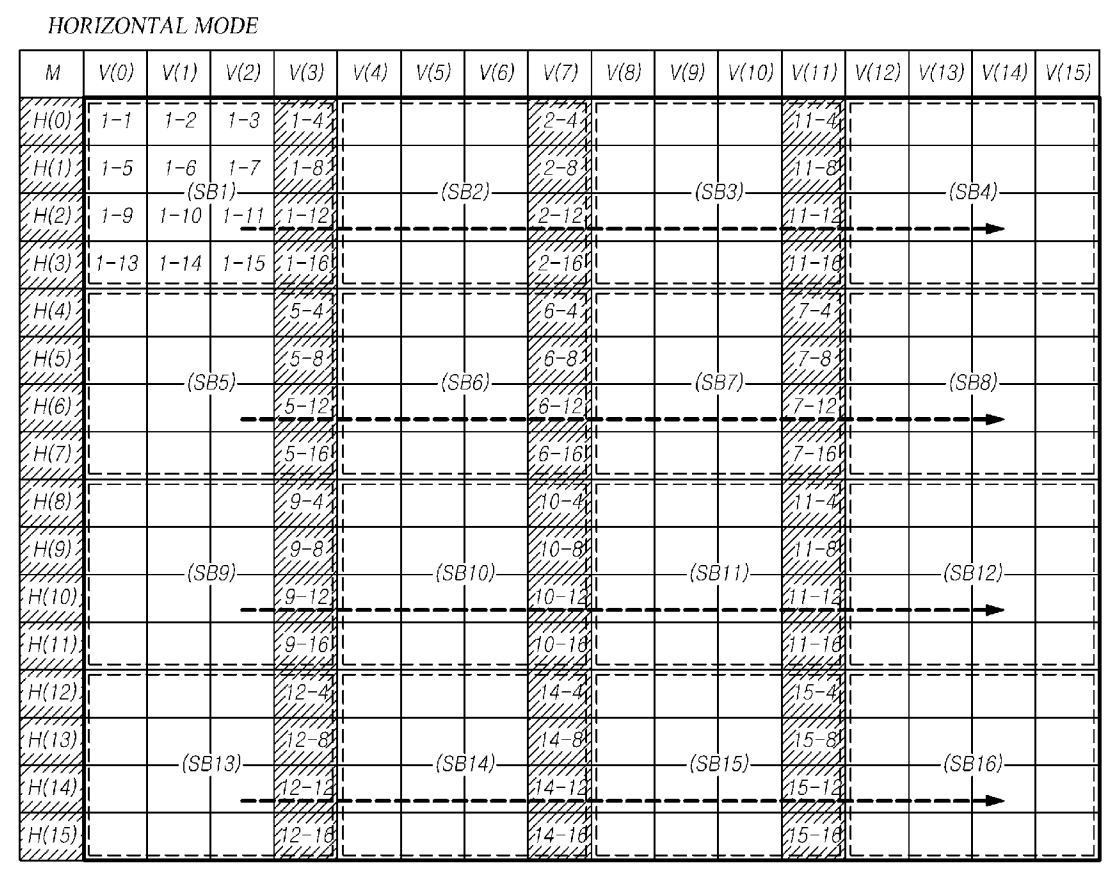

FIG. 4 illustrates an example of an intra prediction encoding of a plurality of sub-blocks according to a sequence of a raster scan when the intra prediction mode of the current block is a horizontal mode.

Referring to FIG. 4, in order to encode the current block, the 16 decomposed sub-blocks (SB 1, SB 2, SB 3, . . . , and SB 16) are sequentially intra-prediction-encoded according to the sequence of a raster scan. That is, the intra prediction encoding is performed in the sequence of sub-blocks SB 1, SB 2, SB 3, SB 4, SB 5, SB 6, SB 7, SB 8, SB 9, SB 10, SB 11, SB 12, SB 13, SB 1 SB 15, and SB 16.

In FIG. 4, since it is assumed that the intra prediction mode of the current block is a horizontal mode, the intra prediction mode of the sub-block is also the horizontal mode. Therefore, the image encoding apparatus 100 performs the intra prediction in the horizontal mode on each sub-block by referring to the adjacent pixel information.

As shown in FIG. 4, by referring to adjacent pixel information (H0), (H1), (H2), and (H3), which are adjacent to the first sub-block (SB 1), among pixel information of macro blocks adjacent to the current block, the image encoding apparatus 100 performs an intra prediction encoding on the first sub-block (SB 1), and simultaneously generates and stores a reference block. The stored reference block includes adjacent pixel information, which is referred to during an intra prediction encoding process for another sub-block.

In FIG. 4, during the intra prediction encoding for the first sub-block (SB 1), pixel information included in the reference block, which has been already encoded, decoded, and stored, is indicated by indices "1-1, 1-2, 1-3, 1-4, 1-5, 1-6, 1-7, 1-8, 1-9, 1-10, 1-11, 1-12, 1-13, 1-14, 1-15, and 1-16". In each index of "first number-second number" indicating the pixel information, the first number identifies a corresponding sub-block, and the second number identifies a corresponding pixel within the corresponding sub-block.

Following SB 1, the image encoding apparatus 100 performs an intra prediction encoding on SB 2 according to the sequence of a raster scan.

Here, the adjacent pixel information referred to during the intra prediction encoding on SB 2 includes pixel information "1-4, 1-8, 1-12, and 1-16" from among the pixel information included in the reference block stored during the intra prediction encoding on SB 1. The reason why "1-4, 1-8, 1-12, and 1-16" are used for reference as adjacent pixel information from among the pixel information included in the reference block is that the intra prediction encoding on SB 2 is performed in the horizontal mode.

Following SB 2, the image encoding apparatus 100 performs an intra prediction encoding on SB 3 according to the sequence of a raster scan. Here, the adjacent pixel information referred to during the intra prediction encoding on SB 3 includes pixel information "2-4, 2-8, 2-12, and 2-16", which are adjacent to SB 3.

Following SB 3, the image encoding apparatus 100 performs an intra prediction encoding on SB 4 according to the sequence of a raster scan. Here, the adjacent pixel information referred to during the intra prediction encoding on SB 4 includes pixel information "3-4, 3-8, 3-12, and 3-16", which are adjacent to SB 4.

Following SB 4, the image encoding apparatus 100 performs an intra prediction encoding on SB 5 according to the sequence of a raster scan. Here, the adjacent pixel information referred to during the intra prediction encoding on SB 5 includes pixel information "(H4), (H5), (H6), and (H7)", which are adjacent to SB 5.

As in the intra prediction encoding process for SB 1, SB 2, SB 3, SB 4, and SB 5 described above, the image encoding apparatus 100 performs an intra prediction encoding on the remaining sub-blocks according to the sequence of a raster scan by referring to already encoded and decoded adjacent pixel information (pixel information having a second number of 4, 8, 12, or 16 in indices of pixel information of each sub-block) in an adjacent sub-block or already encoded and decoded adjacent pixel information in an adjacent macro block.

Figure 5:
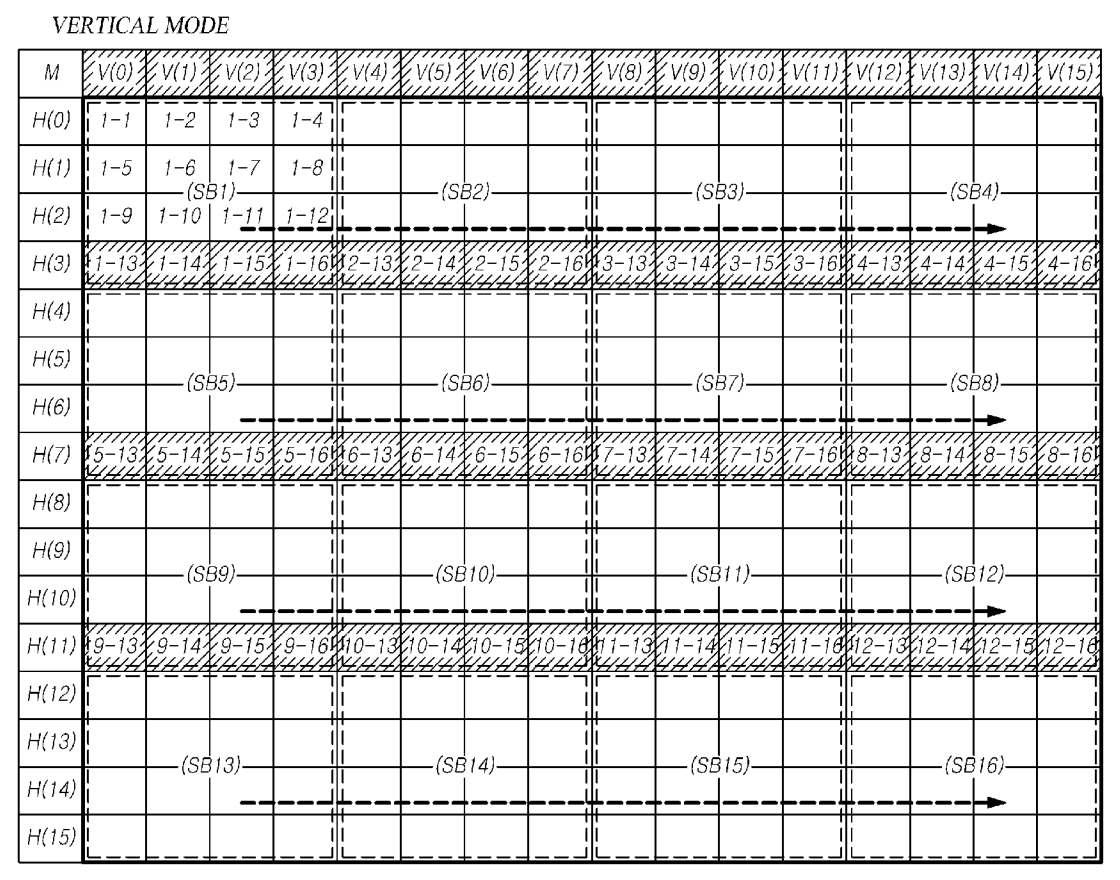

FIG. 5 illustrates an example of an intra prediction encoding of a plurality of sub-blocks according to a sequence of a raster scan when the intra prediction mode of the current block is a vertical mode.

Referring to FIG. 5, in order to encode the current block, the 16 decomposed sub-blocks (SB 1, SB 2, SB 3, . . . , and SB 16) are sequentially intra-prediction-encoded according to the sequence of a raster scan. That is, the intra prediction encoding is performed in the sequence of sub-blocks SB 1, SB 2, SB 3, SB 4, SB 5, SB 6, SB 7, SB 8, SB 9, SB 10, SB 11, SB 12, SB 13, SB 14, SB 15, and SB 16.

In FIG. 5, since it is assumed that the intra prediction mode of the current block is a vertical mode, the intra prediction mode of the sub-block is also the vertical mode. Therefore, the image encoding apparatus 100 performs the intra prediction in the vertical mode on each sub-block by referring to the adjacent pixel information.

As shown in FIG. 5, by referring to adjacent pixel information (V0), (V1), (V2), and (V3), which are adjacent to the first sub-block (SB 1), among pixel information of macro blocks adjacent to the current block, the image encoding apparatus 100 performs an intra prediction encoding on the first sub-block (SB 1), and simultaneously generates and stores a reference block. The stored reference block includes adjacent pixel information, which is referred to during an intra prediction encoding process for another sub-block.

In FIG. 5, during the intra prediction encoding for the first sub-block (SB 1), pixel information included in the reference block, which has been already encoded, decoded, and stored, is indicated by indices "1-1, 1-2, 1-3, 1-4, 1-5, 1-6, 1-7, 1-8, 1-9, 1-10, 1-11, 1-12, 1-13, 1-14, 1-15, and 1-16". In each index of "first number-second number" indicating the pixel information, the first number identifies a corresponding sub-block, and the second number identifies a corresponding pixel within the corresponding sub-block.

Following SB 1, the image encoding apparatus 100 performs an intra prediction encoding on SB 2 according to the sequence of a raster scan. Here, the adjacent pixel information referred to during the intra prediction encoding on SB 2 includes pixel information "(V4), (V5), (V6), and (V7)", which are adjacent to the SB 2, from among the pixel information of the macro blocks adjacent to the current block.

Following SB 2, the image encoding apparatus 100 performs an intra prediction encoding on SB 3 according to the sequence of a raster scan. Here, the adjacent pixel information referred to during the intra prediction encoding on SB 3 includes pixel information "(V8), (V9), (V10), and (V11)", which are adjacent to the SB 3, from among the pixel information of the macro blocks adjacent to the current block.

Following SB 3, the image encoding apparatus 100 performs an intra prediction encoding on SB 4 according to the sequence of a raster scan. Here, the adjacent pixel information referred to during the intra prediction encoding on SB 4 includes pixel information "(V12), (V13), (V14), and (V15)", which are adjacent to the SB 4, from among the pixel information of the macro blocks adjacent to the current block.

Following SB 4, the image encoding apparatus 100 performs an intra prediction encoding on SB 5 according to the sequence of a raster scan.

Here, the adjacent pixel information referred to during the intra prediction encoding on SB 5 includes pixel information "1-13, 1-14, 1-15, and 1-16" from among the pixel information included in the reference block stored during the intra prediction encoding on SB 1, which is a sub-block adjacent to SB 5.

As in the intra prediction encoding process for SB 1, SB 2, SB 3, SB 4, and SB 5 described above, the image encoding apparatus 100 performs an intra prediction encoding on the remaining sub-blocks according to the sequence of a raster scan by referring to already encoded and decoded adjacent pixel information (pixel information having a second number of 13, 14, 15, or 16 in indices of pixel information of each sub-block) in an adjacent sub-block or already encoded and decoded adjacent pixel information in an adjacent macro block.

Figure 6:
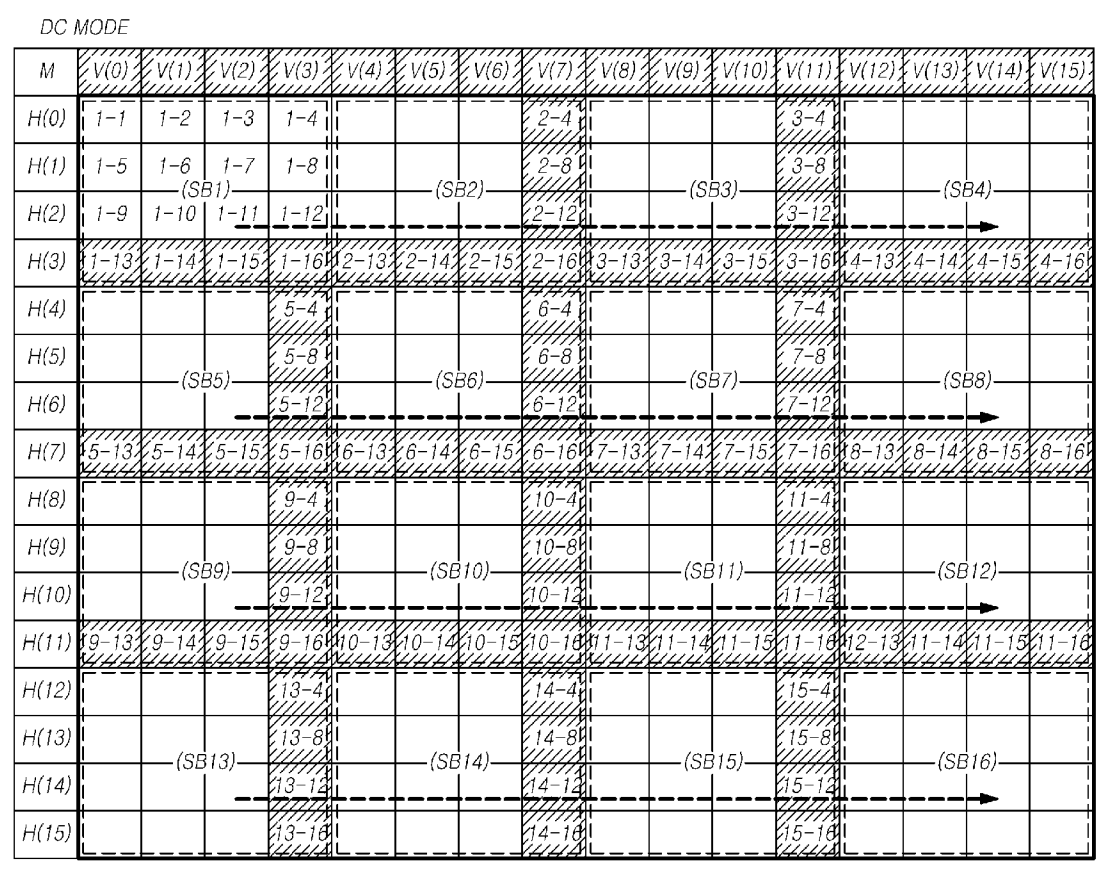

FIG. 6 illustrates an example of an intra prediction encoding of a plurality of sub-blocks according to a sequence of a raster scan when the intra prediction mode of the current block is a DC mode.

Referring to FIG. 6, in order to encode the current block, the 16 decomposed sub-blocks (SB 1, SB 2, SB 3, . . . , and SB 16) are sequentially intra-prediction-encoded according to the sequence of a raster scan. That is, the intra prediction encoding is performed in the sequence of sub-blocks SB 1, SB 2, SB 3, SB 4, SB 5, SB 6, SB 7, SB 8, SB 9, SB 10, SB 11, SB 12, SB 13, SB 14, SB 15, and SB 16.

In FIG. 6, since it is assumed that the intra prediction mode of the current block is a DC mode, the intra prediction mode of the sub-block is also the DC mode. Therefore, the image encoding apparatus 100 performs the intra prediction in the DC mode on each sub-block by referring to the adjacent pixel information.

As shown in FIG. 6, by referring to adjacent pixel information (H0), (H1), (H2), (H3), (V0), (V1), (V2), (V3) and M, which are adjacent to the first sub-block (SB 1), among pixel information of macro blocks adjacent to the current block, the image encoding apparatus 100 performs an intra prediction encoding on the first sub-block (SB 1), and simultaneously generates and stores a reference block. The stored reference block includes adjacent pixel information, which is referred to during an intra prediction encoding process for another sub-block.

In FIG. 6, during the intra prediction encoding for the first sub-block (SB 1), pixel information included in the reference block, which has been already encoded, decoded, and stored, is indicated by indices "1-1, 1-2, 1-3, 1-4, 1-5, 1-6, 1-7, 1-8, 1-9, 1-10, 1-11, 1-12, 1-13, 1-14, 1-15, and 1-16". In each index of "first number-second number" indicating the pixel information, the first number identifies a corresponding sub-block, and the second number identifies a corresponding pixel within the corresponding sub-block.

Following SB 1, the image encoding apparatus 100 performs an intra prediction encoding on SB 2 according to the sequence of a raster scan. Here, the adjacent pixel information referred to during the intra prediction encoding on SB 2 includes pixel information "1-4, 1-8, 1-12, 1-16, (V4), (V5), (V6), (V7), and (V3)". From among the pixel information "1-4, 1-8, 1-12, 1-16, (V4), (V5), (V6), (V7), and (V3)", "1-4, 1-8, 1-12, and 1-16" correspond to pixel information in SB 1, which is a sub-block adjacent to SB 2, and "(V4), (V5), (V6), (V7), and (V3)" correspond to pixel information adjacent to SB 2 from among the pixel information on the macro blocks adjacent to the current block. The reason why "1-4, 1-8, 1-12, 1-16, (V4), (V5), (V6), (V7), and (V3)" are used for reference as adjacent pixel information in the intra prediction encoding on SB 2 as described above is that the intra prediction encoding on SB 2 is performed in the DC mode.

Following SB 2, the image encoding apparatus 100 performs an intra prediction encoding on SB 3 according to the sequence of a raster scan. Here, the adjacent pixel information referred to during the intra prediction encoding on SB 3 includes pixel information "2-4, 2-8, 2-12, 2-16, (V8), (V9), (V10), (V11), and (V7)".

Following SB 3, the image encoding apparatus 100 performs an intra prediction encoding on SB 4 according to the sequence of a raster scan. Here, the adjacent pixel information referred to during the intra prediction encoding on SB 4 includes pixel information "3-4, 3-8, 3-12, 3-16, (V12), (V13), (V14), (V15), and (V11)".

Following SB 4, the image encoding apparatus 100 performs an intra prediction encoding on SB 5 according to the sequence of a raster scan.

Here, the adjacent pixel information referred to during the intra prediction encoding on SB 5 includes pixel information "(H4), (H5), (H6), (H7), 1-13, 1-14, 1-15, 1-16, and (H3)".

As in the intra prediction encoding process for SB 1, SB 2, SB 3, SB 4, and SB 5 described above, the image encoding apparatus 100 performs an intra prediction encoding on the remaining sub-blocks according to the sequence of a raster scan by referring to already encoded and decoded adjacent pixel information (pixel information on pixels located at the right end and the lower end of each sub-block) in an adjacent sub-block or already encoded and decoded adjacent pixel information in an adjacent macro block.

Figure 7:
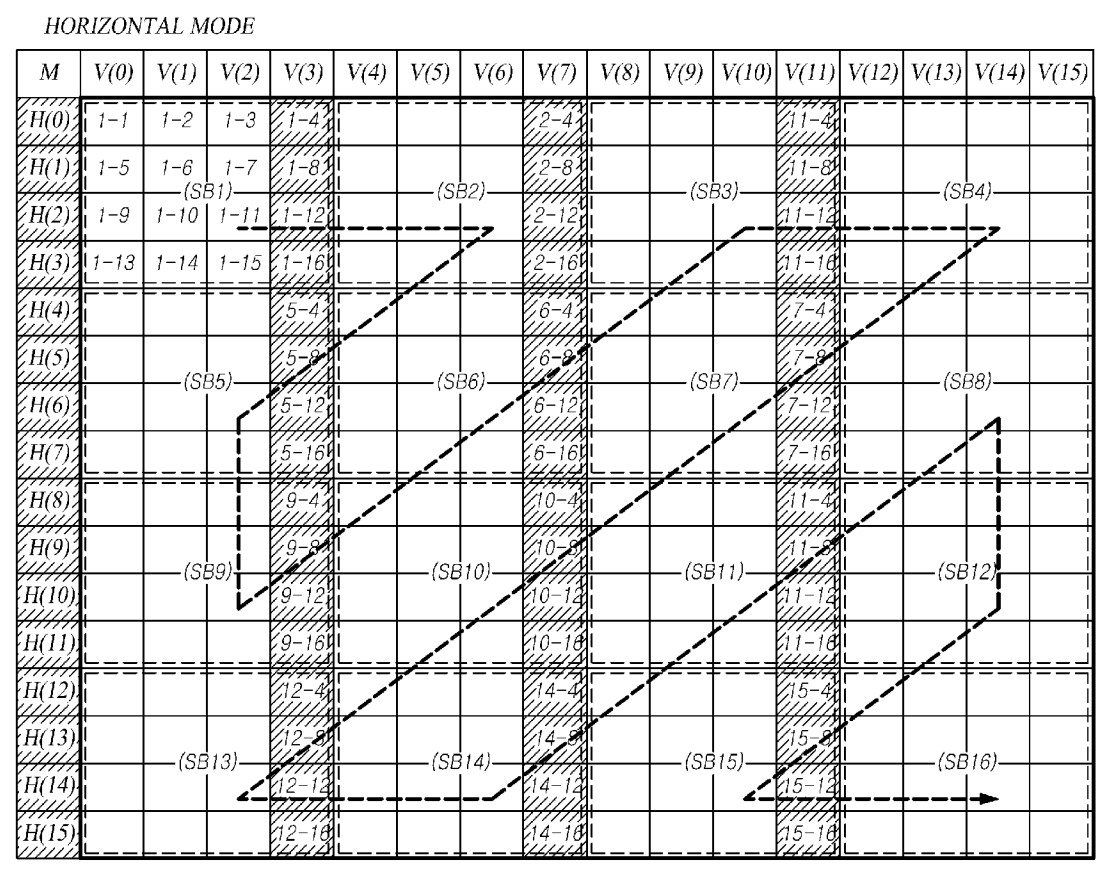

FIG. 7 illustrates an example of an intra prediction encoding of a plurality of sub-blocks according to a zigzag sequence when the intra prediction mode of the current block is a horizontal mode.

Referring to FIG. 7, in order to encode the current block, the 16 decomposed sub-blocks (SB 1, SB 2, SB 3, . . . , and SB 16) are sequentially intra-prediction-encoded according to the zigzag sequence. That is, the intra prediction encoding is performed in the sequence of sub-blocks SB 1, SB 2, SB 5, SB 9, SB 6, SB 3, SB 4, SB 7, SB 10, SB 13, SB 14, SB 11, SB 8, SB 12, SB 15, and SB 16.

In FIG. 7, since it is assumed that the intra prediction mode of the current block is a horizontal mode, the intra prediction mode of the sub-block is also the horizontal mode. Therefore, the image encoding apparatus 100 performs the intra prediction in the horizontal mode on each sub-block by referring to the adjacent pixel information.

As shown in FIG. 7, by referring to adjacent pixel information (H0), (H1), (H2), and (H3), which are adjacent to the first sub-block (SB 1), among pixel information of macro blocks adjacent to the current block, the image encoding apparatus 100 performs an intra prediction encoding on the first sub-block (SB 1), and simultaneously generates and stores a reference block. The stored reference block includes adjacent pixel information, which is referred to during an intra prediction encoding process for another sub-block.

In FIG. 7, during the intra prediction encoding for the first sub-block (SB 1), pixel information included in the reference block, which has been already encoded, decoded, and stored, is indicated by indices "1-1, 1-2, 1-3, 1-4, 1-5, 1-6, 1-7, 1-8, 1-9, 1-10, 1-11, 1-12, 1-13, 1-14, 1-15, and 1-16". In each index of "first number-second number" indicating the pixel information, the first number identifies a corresponding sub-block, and the second number identifies a corresponding pixel within the corresponding sub-block.

Following SB 1, the image encoding apparatus 100 performs an intra prediction encoding on SB 2 according to the zigzag sequence. Here, the adjacent pixel information referred to during the intra prediction encoding on SB 2 includes pixel information "1-4, 1-8, 1-12, and 1-16" from among the pixel information included in the reference block stored during the intra prediction encoding on SB 1. The reason why "1-4, 1-8, 1-12, and 1-16" are used for reference as adjacent pixel information from among the pixel information included in the reference block is that the intra prediction encoding on SB 2 is performed in the horizontal mode.

Following SB 2, the image encoding apparatus 100 performs an intra prediction encoding on SB 5 according to the zigzag sequence. Here, the adjacent pixel information referred to during the intra prediction encoding on SB 5 includes pixel information "H(4), (H5), (H6), and (H7)", which are adjacent to SB 5, from among the pixel information on the macro blocks adjacent to the current block.

Following SB 5, the image encoding apparatus 100 performs an intra prediction encoding on SB 9 according to the zigzag sequence. Here, the adjacent pixel information referred to during the intra prediction encoding on SB 9 includes pixel information "H(8), (H9), (H10), and (H11)", which are adjacent to SB 9, from among the pixel information on the macro blocks adjacent to the current block.

Following SB 9, the image encoding apparatus 100 performs an intra prediction encoding on SB 6 according to the zigzag sequence. Here, the adjacent pixel information referred to during the intra prediction encoding on SB 6 includes pixel information "5-4, 5-8, 5-12, and 5-16" from among the pixel information included in the reference block stored during the intra prediction encoding on SB 5.

As in the intra prediction encoding process for SB 1, SB 2, SB 5, SB 9, and SB 6 described above, the image encoding apparatus 100 performs an intra prediction encoding on the remaining sub-blocks according to the zigzag sequence by referring to already encoded and decoded adjacent pixel information (pixel information having a second number of 4, 8, 12, or 16 in indices of pixel information of each sub-block) in an adjacent sub-block or already encoded and decoded adjacent pixel information in an adjacent macro block.

Figure 8:
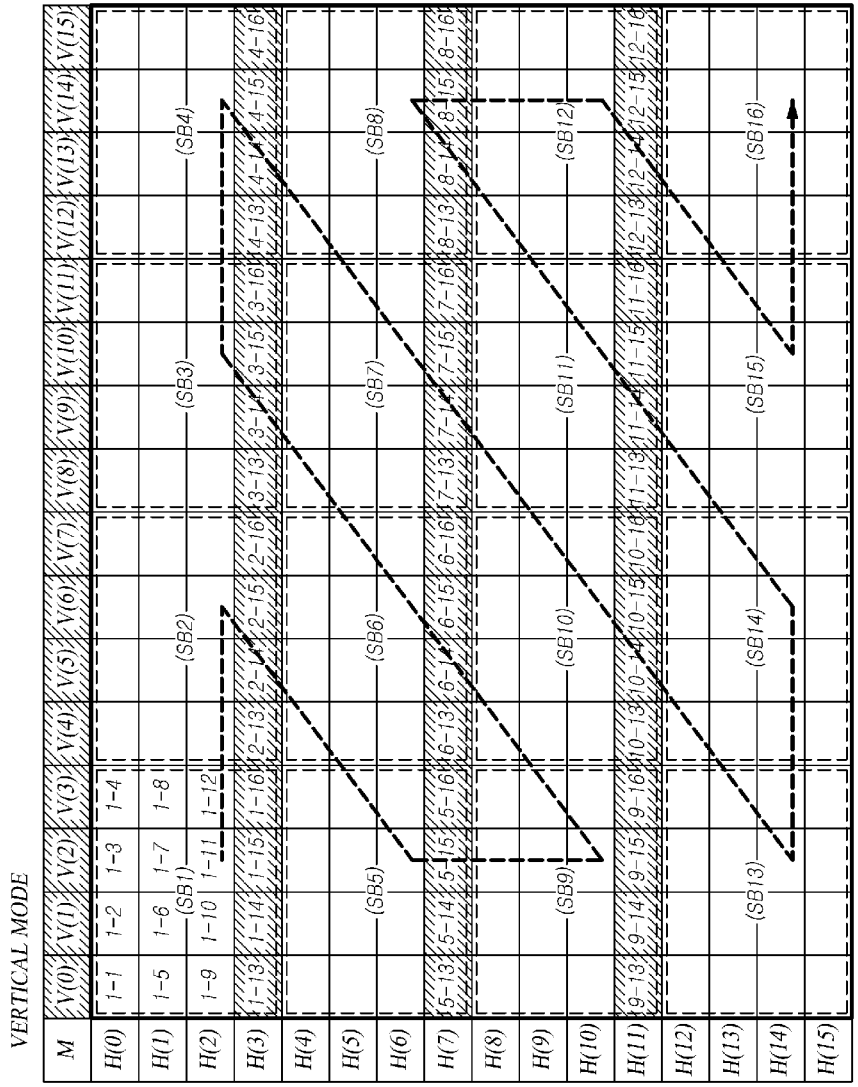
FIG. 8 illustrates an example of an intra prediction encoding of a plurality of sub-blocks according to a zigzag sequence when the intra prediction mode of the current block is a vertical mode.
Figure 10:
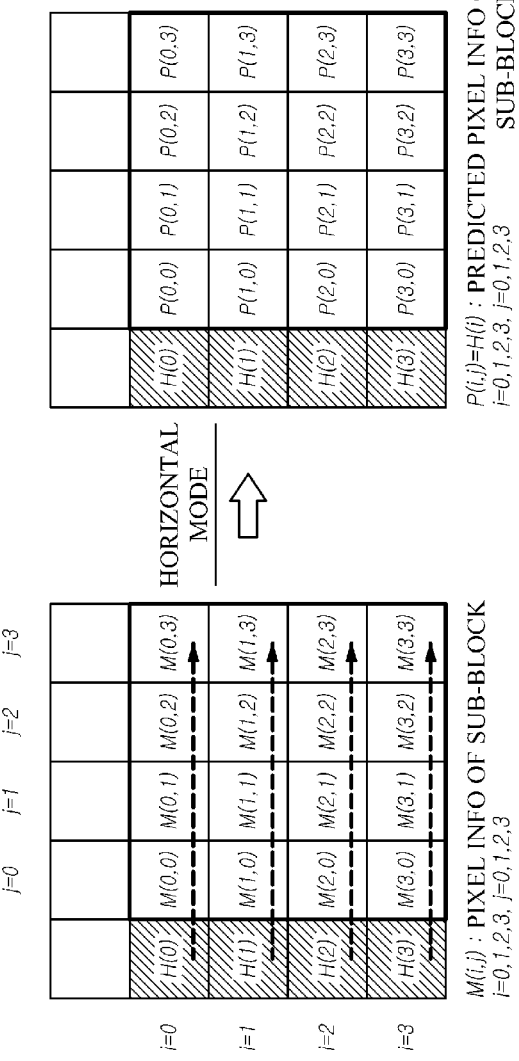
FIGS. 10A and 10B are views illustrating an example of a process of performing an intra prediction on one sub-block in a horizontal mode.
Figure 11:
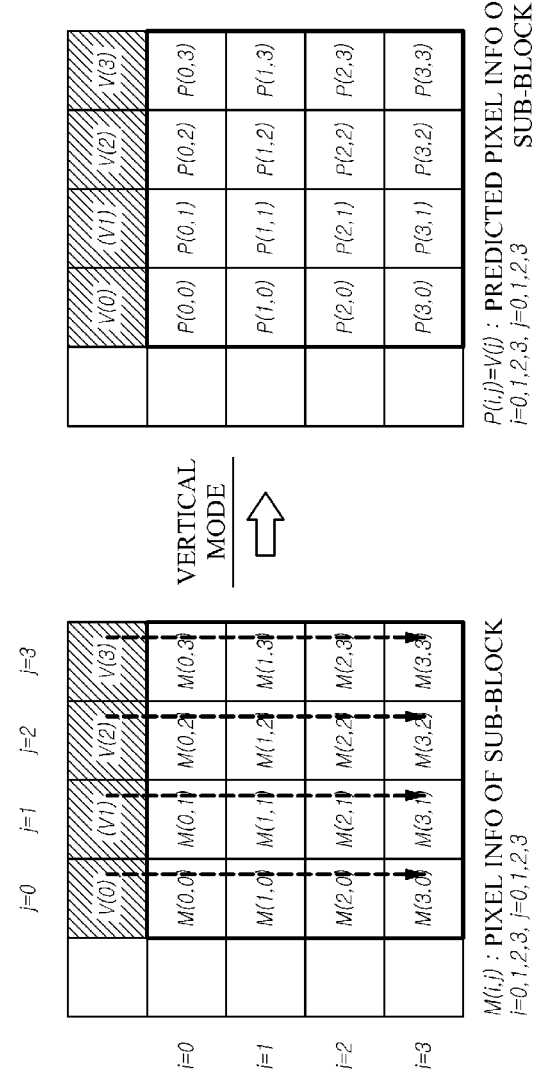
FIGS. 11A and 11B are views illustrating an example of a process of performing an intra prediction on one sub-block in a vertical mode.
Figure 12:

FIG. 8 illustrates an example of an intra prediction encoding of a plurality of sub-blocks according to a zigzag sequence when the intra prediction mode of the current block is a vertical mode.

Referring to FIG. 8, in order to encode the current block, the 16 decomposed sub-blocks (SB 1, SB 2, SB 3, . . . , and SB 16) are sequentially intra-prediction-encoded according to the zigzag sequence. That is, the intra prediction encoding is performed in the sequence of sub-blocks SB 1, SB 2, SB 5, SB 9, SB 6, SB 3, SB 4, SB 7, SB 10, SB 13, SB 14, SB 11, SB 8, SB 12, 15, and SB 16.

In FIG. 8, since it is assumed that the intra prediction mode of the current block is a vertical mode, the intra prediction mode of the sub-block is also the vertical mode. Therefore, the image encoding apparatus 100 performs the intra prediction in the vertical mode on each sub-block by referring to the adjacent pixel information.

As shown in FIG. 8, by referring to adjacent pixel information (V0), (V1), (V2), and (V3), which are adjacent to the first sub-block SB 1, among pixel information of macro blocks adjacent to the current block, the image encoding apparatus 100 performs an intra prediction encoding on the first sub-block SB 1, and simultaneously generates and stores a reference block. The stored reference block includes adjacent pixel information, which is referred to during an intra prediction encoding process for another sub-block.

In FIG. 8, during the intra prediction encoding for the first sub-block (SB 1), pixel information included in the reference block, which has been already encoded, decoded, and stored, is indicated by indices "1-1, 1-2, 1-3, 1-4, 1-5, 1-6, 1-7, 1-8, 1-9, 1-10, 1-11, 1-12, 1-13, 1-14, 1-15, and 1-16". In each index of "first number-second number" indicating the pixel information, the first number identifies a corresponding sub-block, and the second number identifies a corresponding pixel within the corresponding sub-block.

Following SB 1, the image encoding apparatus 100 performs an intra prediction encoding on SB 2 according to the zigzag sequence. Here, the adjacent pixel information referred to during the intra prediction encoding on SB 2 includes pixel information "(V4), (V5), (V6), and (V7)", which are adjacent to the SB 2, from among the pixel information of the macro blocks adjacent to the current block.

Following SB 2, the image encoding apparatus 100 performs an intra prediction encoding on SB 5 according to the zigzag sequence. Here, the adjacent pixel information referred to during the intra prediction encoding on SB 5 includes pixel information "1-13, 1-14, 1-15, and 1-16" from among the pixel information included in the reference block stored during the intra prediction encoding on SB 1, which is a sub-block adjacent to SB 5. The reason why "1-13, 1-14, 1-15, and 1-16" from among the pixel information included in the reference block stored for SB 1 is used for reference as adjacent pixel information is that the intra prediction encoding on SB 5 is performed in the vertical mode.

Following SB 5, the image encoding apparatus 100 performs an intra prediction encoding on SB 9 according to the zigzag sequence. Here, the adjacent pixel information referred to during the intra prediction encoding on SB 9 includes pixel information of pixel information "5-13, 5-14, 5-15, and 5-16" from among the pixel information included in the reference block stored during the intra prediction encoding on SB 5, which is a sub-block adjacent to SB 9.

Following SB 9, the image encoding apparatus 100 performs an intra prediction encoding on SB 6 according to the zigzag sequence. Here, the adjacent pixel information referred to during the intra prediction encoding on SB 6 includes pixel information "2-13, 2-14, 2-15, and 2-16" from among the pixel information included in the reference block stored during the intra prediction encoding on SB 2, which is a sub-block adjacent to SB 6.

As in the intra prediction encoding process for SB 1, SB 2, SB 5, SB 9, and SB 6 described above, the image encoding apparatus 100 performs an intra prediction encoding on the remaining sub-blocks according to the zigzag sequence by referring to already encoded and decoded adjacent pixel information (pixel information having a second number of 13, 14, 15, or 16 in indices of pixel information of each sub-block) in an adjacent sub-block or already encoded and decoded adjacent pixel information in an adjacent macro block.

Figure 9:
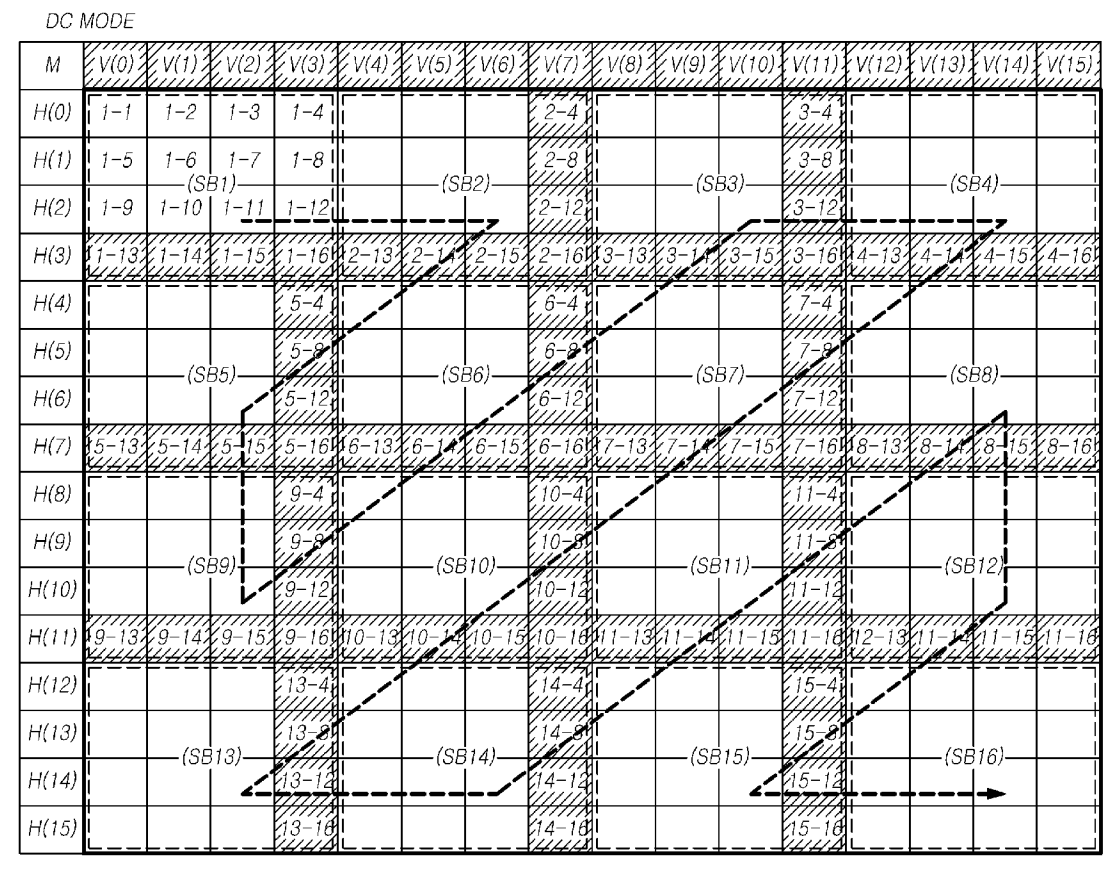

FIG. 9 illustrates an example of an intra prediction encoding of a plurality of sub-blocks according to a zigzag sequence when the intra prediction mode of the current block is a DC mode.

Referring to FIG. 9, in order to encode the current block, the 16 decomposed sub-blocks (SB 1, SB 2, SB 3, . . . , and SB 16) are sequentially intra-prediction-encoded according to the zigzag sequence. That is, the intra prediction encoding is performed in the sequence of sub-blocks SB 1, SB 2, SB 5, SB 9, SB 6, SB 3, SB 4, SB 7, SB 10, SB 13, SB 14, SB 11, SB 8, SB 12, SB 15, and SB 16.

In FIG. 9, since it is assumed that the intra prediction mode of the current block is a DC mode, the intra prediction mode of the sub-block is also the DC mode. Therefore, the image encoding apparatus 100 performs the intra prediction in the DC mode on each sub-block by referring to the adjacent pixel information.

As shown in FIG. 9, by referring to adjacent pixel information (H0), (H1), (H2), (H3), (V0), (V1), (V2), (V3) and M, which are adjacent to the first sub-block (SB 1), among pixel information of macro blocks adjacent to the current block, the image encoding apparatus 100 performs an intra prediction encoding on the first sub-block (SB 1), and simultaneously generates and stores a reference block. The stored reference block includes adjacent pixel information, which is referred to during an intra prediction encoding process for another sub-block.

In FIG. 9, during the intra prediction encoding for the first sub-block (SB 1), pixel information included in the reference block, which has been already encoded, decoded, and stored, is indicated by indices "1-1, 1-2, 1-3, 1-4, 1-5, 1-6, 1-7, 1-8, 1-9, 1-10, 1-11, 1-12, 1-13, 1-14, 1-15, and 1-16". In each index of "first number-second number" indicating the pixel information, the first number identifies a corresponding sub-block, and the second number identifies a corresponding pixel within the corresponding sub-block.

Following SB 1, the image encoding apparatus 100 performs an intra prediction encoding on SB 2 according to the zigzag sequence. Here, the adjacent pixel information referred to during the intra prediction encoding on SB 2 includes pixel information "1-4, 1-8, 1-12, 1-16, (V4), (V5), (V6), (V7), and (V3)". From among the pixel information "1-4, 1-8, 1-12, 1-16, (V4), (V5), (V6), (V7), and (V3)", "1-4, 1-8, 1-12, and 1-16" correspond to pixel information in SB 1, which is a sub-block adjacent to SB 2, and "(V4), (V5), (V6), (V7), and (V3)" correspond to pixel information adjacent to SB 2 from among the pixel information on the macro blocks adjacent to the current block. The reason why "1-4, 1-8, 1-12, 1-16, (V4), (V5), (V6), (V7), and (V3)" are used for reference as adjacent pixel information in the intra prediction encoding on SB 2 as described above is that the intra prediction encoding on SB 2 is performed in the DC mode.

Following SB 2, the image encoding apparatus 100 performs an intra prediction encoding on SB 5 according to the zigzag sequence. Here, the adjacent pixel information referred to during the intra prediction encoding on SB 5 includes pixel information "(H4), (H5), (H6), (H7), 1-13, 1-14, 1-15, 1-16, and (H3)". From among the pixel information "(H4), (H5), (H6), (H7), 1-13, 1-14, 1-15, 1-16, and (H3)", "(H4), (H5), (H6), (H7), and (H3)" correspond to pixel information adjacent to SB 5 from among the pixel information on the macro blocks adjacent to the current block, and "1-13, 1-14, 1-15, and 1-16" correspond to pixel information in SB 1, which is a sub-block adjacent to SB 5.

Following SB 5, the image encoding apparatus 100 performs an intra prediction encoding on SB 9 according to the zigzag sequence. Here, the adjacent pixel information referred to during the intra prediction encoding on SB 9 includes pixel information "(H8), (H9), (H10), (H11), 5-13, 5-14, 5-15, 5-16, and (H7)".

Following SB 9, the image encoding apparatus 100 performs an intra prediction encoding on SB 6 according to the zigzag sequence. Here, the adjacent pixel information referred to during the intra prediction encoding on SB 6 includes pixel information "5-4, 5-8, 5-12, 5-16, 2-13, 2-14, 2-15, 2-16, and 1-16". From among the pixel information, "5-4, 5-8, 5-12, and 5-16" correspond to pixel information in SB 5, which is a sub-block adjacent to SB 6, "2-13, 2-14, 2-15, and 2-16" correspond to pixel information in SB 2, which is a sub-block adjacent to SB 6, and "1-16" corresponds to pixel information in SB 1, which is a sub-block adjacent to SB 6.

As in the intra prediction encoding process for SB 1, SB 2, SB 5, SB 9, and SB 6 described above, the image encoding apparatus 100 performs an intra prediction encoding on the remaining sub-blocks according to the zigzag sequence by referring to already encoded and decoded adjacent pixel information (pixel information on pixels located at the right end and the lower end of each sub-block) in an adjacent sub-block or already encoded and decoded adjacent pixel information in an adjacent macro block.

Figure 13:
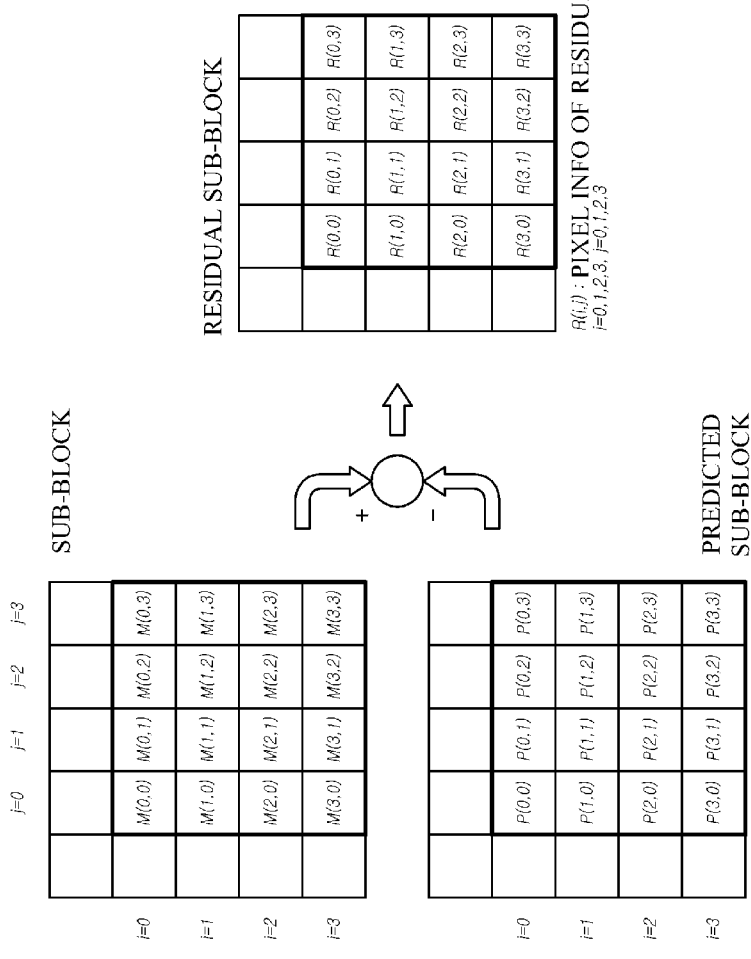
FIG. 13 is a view for describing a process of generating a residual block for a certain sub-block on which an intra prediction has been performed.

The above description with reference to FIGS. 4 to 9 presents embodiments of the present disclosure, in which the image encoding apparatus 100 intra-prediction-encodes sub-blocks of a current block in three types of intra prediction modes (horizontal mode, vertical mode, or DC mode) according to a predetermined sequence (sequence of a raster scan or a zigzag sequence). Hereinafter, the process of intra prediction encoding for each sub-block is described in more detail with reference to FIGS. 10A to 13. FIGS. 10A to 12 are views for describing an intra prediction for a certain sub-block when the intra prediction mode of the current block is the horizontal mode, vertical mode, and DC mode, respectively, and FIG. 13 is a view for describing a process of generating a residual block for a certain sub-block on which an intra prediction has been performed.

FIGS. 10A and 10B are views illustrating an example of a process of performing an intra prediction on one sub-block in a horizontal mode.

FIG. 10A illustrates a sub-block before the intra prediction is performed, and FIG. 10B illustrates a predicted sub-block generated through the intra prediction on the sub-block. It is assumed that the sub-block has a block size of 4×4, is marked by a thick solid line, and includes 16 pixels.

Referring to FIG. 10A, each pixel included in a certain sub-block before the intra prediction contains corresponding pixel information relating to an original image. Each of 16 pixel information indices relating to the original image is expressed in the form of 4×4 coordinates, "M(i,j)", including four rows (i) and four columns (j). For example, M(2,3) indicates pixel information of a pixel located at the third row (i=2) and the fourth column (j=3).

Further, since it is assumed that the intra prediction is performed in the horizontal mode, adjacent pixel information used for reference in an intra prediction of a certain sub-block is pixel information included in a sub-block (or macro block) adjacent to the left side of the certain sub-block and corresponds to "H(0), H(1), H(3), and H(3)". Here, "H(0), H(1), H(3), and H(3)" refer to pixel information of four predetermined pixels horizontally adjacent to a certain sub-block being intra-predicted.

By intra-predicting a sub-block as shown in FIG. 10A in the horizontal mode, a predicted sub-block as shown in FIG. 10B is generated. The generated predicted sub-block includes 16 pixels, each of which contains predicted pixel information. The predicted pixel information is indicated by an index expressed in the form of 4×4 coordinates, "P(i,j)", including four rows (i) and four columns (j). For example, P(2,3) indicates predicted pixel information of a pixel located at the third row (i=2) and the fourth column (j=3).

The predicted pixel information P(i,j) of each pixel included in a predicted sub-block, which is generated by performing an intra prediction on a certain sub-block in the horizontal mode, can be obtained by, for example, a method using the equation as defined below. In the equation defined below, H(i) indicates already encoded and decoded adjacent pixel information.

$$\text{for } (i=0; i<4; i++)$$

$$\text{for } (j=0; j<4; j++)$$

$$P(i,j)=H(i);$$

After the predicted sub-block is generated, a residual sub-block as shown in FIG. 13 is generated by subtracting the predicted sub-block shown in FIG. 10B from the sub-block shown in FIG. 10A. Each pixel included in the generated residual sub-block contains residual pixel information indicated by "R(i,j)", which is obtained by subtracting P(i,j) from M(i,j).

The generated residual sub-block is then transformed, quantized, and entropy-encoded, so that the intra prediction encoding for the certain sub-block is completed. Further, by performing a dequantization, an inverse transform, and an intra-compensation on the quantized residual sub-block, a reference block is generated. Then, the generated reference block is used for a later intra prediction encoding of another sub-block.

The reference pixel information of each pixel included in the reference sub-block can be obtained by a method using the equation as defined below. In the equation, R'(i,j) indicates pixel information included in a residual sub-block obtained by dequantizing and inverse-transforming the quantized residual sub-block, and O'(i,j) indicates reference pixel information included in a reference sub-block obtained by intra-compensating and decoding such a residual sub-block.

$$\text{for } (i=0; i<4; i++)$$

$$\text{for } (j=0; j<4; j++)$$

$$O'(i,j)=H(i)+R'(i,j);$$

The above description discusses an example of an intra prediction encoding process including an intra prediction of a horizontal mode for one sub-block. Now, an example of an intra prediction encoding process including an intra prediction of a vertical mode for a certain sub-block will be discussed with reference to FIGS. 11A and 11B.

FIGS. 11A and 11B are views illustrating an example of a process of performing an intra prediction on one sub-block in a vertical mode.

FIG. 11A illustrates a sub-block before the intra prediction is performed, and FIG. 11B illustrates a predicted sub-block generated through the intra prediction on the sub-block. It is assumed that the sub-block has a block size of 4×4, is marked by a thick solid line, and includes 16 pixels.

Referring to FIG. 11A, each pixel included in a certain sub-block before the intra prediction contains corresponding pixel information relating to an original image. Each of 16 pixel information indices relating to the original image is expressed in the form of 4×4 coordinates, "M(i,j)", including four rows (i) and four columns (j). For example, M(2,3) indicates pixel information of a pixel located at the third row (i=2) and the fourth column (j=3).

Further, since it is assumed that the intra prediction is performed in the vertical mode, adjacent pixel information used for reference in an intra prediction of a certain sub-block is pixel information included in a sub-block (or macro block) adjacent to the upper side of the certain sub-block and corresponds to "V(0), V(1), V(3), and V(3)". Here, "V(0), V(1), V(3), and V(3)" refer to pixel information of four predetermined pixels vertically adjacent to a certain sub-block being intra-predicted.

By intra-predicting a sub-block as shown in FIG. 11A in the vertical mode, a predicted sub-block as shown in FIG. 11B is generated. The generated predicted sub-block includes 16 pixels, each of which contains predicted pixel information. The predicted pixel information is indicated by an index expressed in the form of 4×4 coordinates, "P(i,j)", including four rows (i) and four columns (j). For example, P(2,3) indicates predicted pixel information of a pixel located at the third row (i=2) and the fourth column (j=3).

The predicted pixel information P(i,j) of each pixel included in a predicted sub-block, which is generated by performing an intra prediction on a certain sub-block in the vertical mode, can be obtained by, for example, a method using the equation as defined below. In the equation defined below, V(j) indicates already encoded and decoded adjacent pixel information.

```
for (j=0;j<4;j++)
    for (i=0;i<4;i++)
        P(i,j)=V(j);
```

After the predicted sub-block is generated, a residual sub-block as shown in FIG. 13 is generated by subtracting the predicted sub-block shown in FIG. 11B from the sub-block shown in FIG. 11A. Each pixel included in the generated residual sub-block contains residual pixel information indicated by "R(i,j)", which is obtained by subtracting P(i,j) from M(i,j).

The generated residual sub-block is then transformed, quantized, and entropy-encoded, so that the intra prediction encoding for the certain sub-block is completed. Further, by performing a dequantization, an inverse transform, and an intra-compensation on the quantized residual sub-block, a reference block is generated. Then, the generated reference block is used for a later intra prediction encoding of another sub-block.

The reference pixel information of each pixel included in the reference sub-block can be obtained by a method using the equation as defined below. In the equation, R'(i,j) indicates pixel information included in a residual sub-block obtained by dequantizing and inverse-transforming the quantized residual sub-block, and O'(i,j) indicates reference pixel information included in a reference sub-block obtained by intra-compensating and decoding such a residual sub-block.

```
for (j=0;j<4;j++)
    for (i=0;i<4;i++)
        O'(i,j)=V(j)+R'(i,j);
```

The above description discusses an example of an intra prediction encoding process including an intra prediction of a vertical mode for one sub-block. Now, an example of an intra prediction encoding process including an intra prediction of a DC mode for a certain sub-block will be discussed with reference to FIGS. 12A and 12B.

FIGS. 12A and 10B are views illustrating an example of a process of performing an intra prediction on one sub-block in a DC mode.

FIG. 12A illustrates a sub-block before the intra prediction is performed, and FIG. 12B illustrates a predicted sub-block generated through the intra prediction on the sub-block. It is assumed that the sub-block has a block size of 4×4, is marked by a thick solid line, and includes 16 pixels.

Referring to FIG. 12A, each pixel included in a certain sub-block before the intra prediction contains corresponding pixel information relating to an original image. Each of 16 pixel information indices relating to the original image is expressed in the form of 4×4 coordinates, "M(i,j)", including four rows (i) and four columns (j). For example, M(2,3) indicates pixel information of a pixel located at the third row (i=2) and the fourth column (j=3).

Further, since it is assumed that the intra prediction is performed in the DC mode, adjacent pixel information used for reference in an intra prediction of a certain sub-block is pixel information included in a sub-block (or macro block) adjacent to the left side and upper side of the certain sub-block and corresponds to "H(0), H(1), H(3), H(3), V(0), V(1), V(3), V(3), and M".

Here, "H(0), H(1), H(3), and H(3)" refer to pixel information of four predetermined pixels horizontally adjacent to a certain sub-block being intra-predicted, "V(0), V(1), V(3), and V(3)" refer to pixel information of four predetermined pixels vertically adjacent to a certain sub-block being intra-predicted, and M refers to pixel information of a pixel adjacent in a leftward and upward diagonal direction to a certain sub-block being intra-predicted.

By intra-predicting a sub-block as shown in FIG. 12A in the DC mode, a predicted sub-block as shown in FIG. 12B is generated. The generated predicted sub-block includes 16 pixels, each of which contains predicted pixel information. The predicted pixel information is indicated by an index expressed in the form of 4×4 coordinates, "P(i,j)", including four rows (i) and four columns (j). For example, P(2,3) indicates predicted pixel information of a pixel located at the third row (i=2) and the fourth column (j=3).

The predicted pixel information P(i,j) of each pixel included in a predicted sub-block, which is generated by performing an intra prediction on a certain sub-block in the DC mode, can be obtained by, for example, a method using the equation as defined below. In the equation defined below, H(i) indicates already encoded and decoded adjacent pixel information.

```
for (j=0; j<4; j++)
    for (i=0; i<4; i++)
    {
        k=3;              //size of sub-block =(k+1)×(k+1)
        Avg=Mean [H(0), H(1), ..., H(k), V(0), V(1), ..., V(k), M];
                          // Mean[ ] refers to averaging of
values within [ ].
        P(i,j) = Avg;
    }
```

After the predicted sub-block is generated, a residual sub-block as shown in FIG. 13 is generated by subtracting the predicted sub-block shown in FIG. 12B from the sub-block shown in FIG. 12A. Each pixel included in the generated residual sub-block contains residual pixel information indicated by "R(i,j)", which is obtained by subtracting P(i,j) from M(i,j).

The generated residual sub-block is then transformed, quantized, and entropy-encoded, so that the intra prediction encoding for the certain sub-block is completed. Further, by performing a dequantization, an inverse transform, and an intra-compensation on the quantized residual sub-block, a reference block is generated. Then, the generated reference block is used for a later intra prediction encoding of another sub-block.

The reference pixel information of each pixel included in the reference sub-block can be obtained by a method using the equation as defined below. In the equation, R'(i,j) indicates pixel information included in a residual sub-block obtained by dequantizing and inverse-transforming the quantized residual sub-block, and O'(i,j) indicates reference pixel information included in a reference sub-block obtained by intra-compensating and decoding such a residual sub-block.

```
for (j=0;j<4;j++)
    for (i=0;i<4;i++)
        O'(i,j)=Avg+R'(i,j);
```

The above description discusses an example of an intra prediction encoding process including intra predictions of a horizontal mode, a vertical mode, and a DC mode for one sub-block.

The image encoding according to the present disclosure as described above is based on H.264, and can also be performed according to a method defined in H.264 for another intra prediction mode other than the horizontal mode, the vertical mode, and the DC mode.

Figure 14:
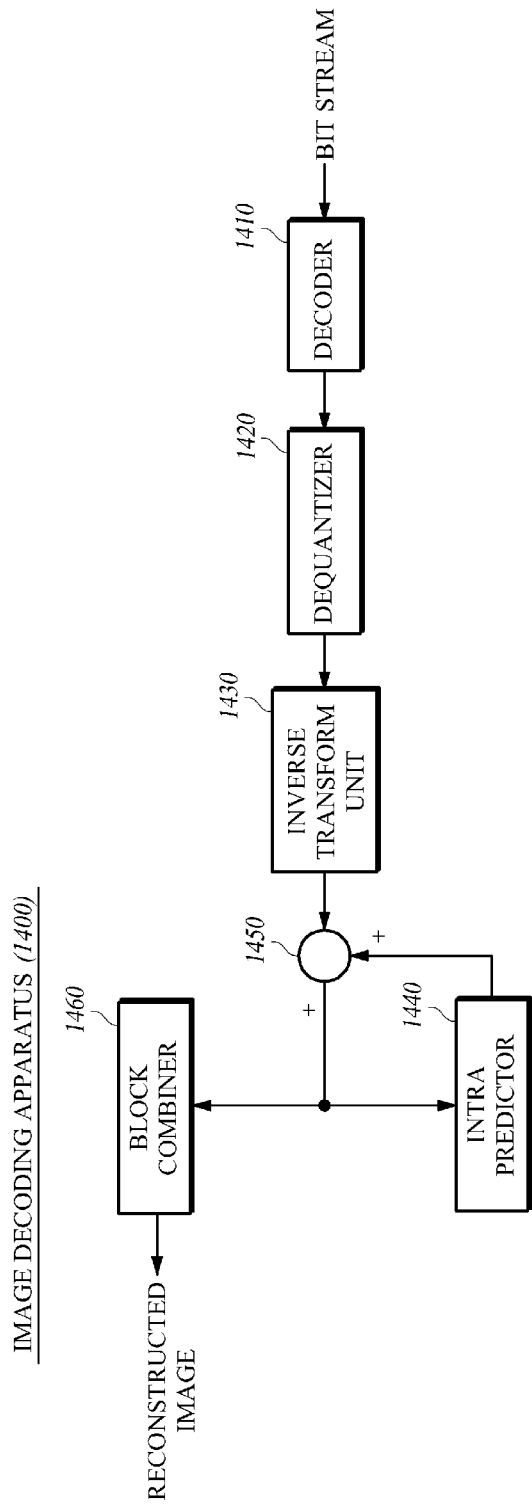
FIG. 14 is a schematic block diagram of an image decoding apparatus 1400 according to an embodiment of the present disclosure.

FIG. 14 is a schematic block diagram of an image decoding apparatus 1400 according to an embodiment of the present disclosure.

Referring to FIG. 14, the image decoding apparatus 1400 according to an embodiment of the present disclosure includes: a decoder 1410 for decoding a received bit stream, so as to extract residual sub-blocks and an intra prediction mode for a plurality of sub-blocks decomposed from a current block; a dequantizer 1420 for dequantizing the extracted residual sub-block; an inverse transform unit 1430 for performing an inverse transform on the dequantized residual sub-block; an intra predictor 1440 for generating predicted sub-blocks for a plurality of sub-blocks by performing an intra prediction according to an intra prediction mode by referring to adjacent pixel information for each sub-block already decoded and reconstructed; an adder 1450 for reconstructing a plurality of sub-blocks by adding the inverse-transformed residual sub-blocks and corresponding generated predicted sub-blocks; and a block combiner 1460 for reconstructing the current block by combining the plurality of reconstructed sub-blocks with each other.

The intra prediction mode for the plurality of sub-blocks described above is the same as the intra prediction mode of the current block.

The block combiner 1460 may combine the plurality of reconstructed sub-blocks according to either a sequence of a raster scan or a zigzag sequence.

The received bit stream described above corresponds to a bit stream encoded according to an image encoding method according to an embodiment of the present disclosure.

The image decoding apparatus 1400 according to an embodiment of the present disclosure may share parameters or information necessary for decoding, dequantization, inverse-transform, and intra prediction, etc. with the image encoding apparatus 100 according to a predetermined scheme. For example, by receiving a bit stream including information on the intra prediction mode of the current block or information, by which it is possible to determined the intra prediction mode of the current block, the image decoding apparatus 1400 may share the information on the intra prediction mode with the image encoding apparatus 100.

Figure 15:
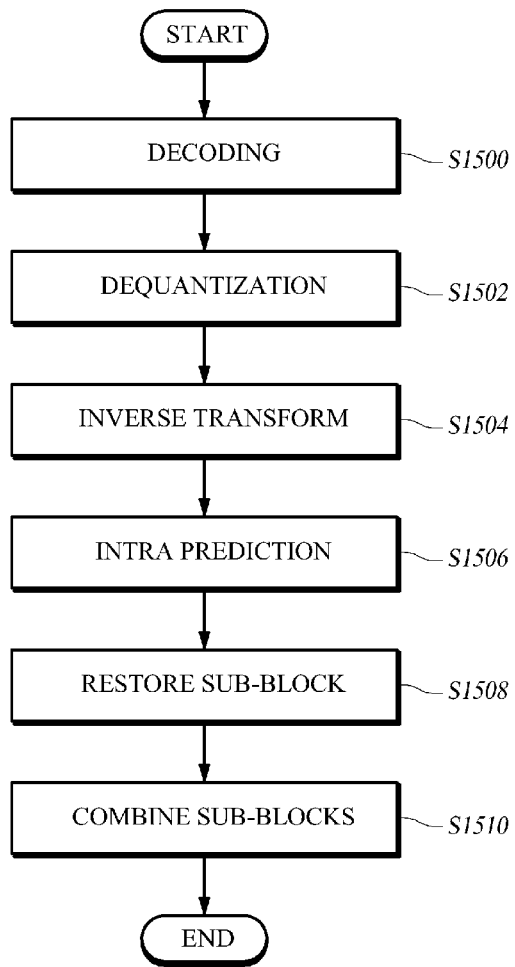
FIG. 15 is a flowchart of an image decoding method according to an embodiment of the present disclosure.

FIG. 15 is a flowchart of an image decoding method according to an embodiment of the present disclosure.

Referring to FIG. 15, an image decoding method according to an embodiment of the present disclosure includes the steps of: (S1500) decoding a received bit stream, so as to extract residual sub-blocks and an intra prediction mode for a plurality of sub-blocks decomposed from a current block; (S1502) dequantizing the extracted residual sub-block; (S1504) performing an inverse transform on the dequantized residual sub-block; (S1506) generating predicted sub-blocks for a plurality of sub-blocks by performing an intra prediction according to an intra prediction mode by referring to adjacent pixel information for each sub-block already decoded and reconstructed; (S1508) reconstructing a plurality of sub-blocks by adding the inverse-transformed residual sub-blocks and corresponding generated predicted sub-blocks; and (S1510) reconstructing the current block by combining the plurality of reconstructed sub-blocks with each other.

In step S1510, the plurality of reconstructed sub-blocks may be combined according to either a sequence of a raster scan or a zigzag sequence.

The intra prediction mode for the plurality of sub-blocks described above is the same as the intra prediction mode of the current block.

In the image encoding method and image decoding method according to an embodiment of the present disclosure, when a current block to be encoded or decoded is predicted, the current block is decomposed into sub-blocks and each of the sub-blocks is then intra-predicted by referring to adjacent pixel information of pixels adjacent to the corresponding sub-block, instead of performing an intra prediction on each decomposed sub-block by referring to adjacent pixel information of surrounding blocks adjacent to the current block. As a result, the image encoding method and image decoding method according to the present disclosure can improve the accuracy of the prediction, which can provide an image with a satisfactory reproduction quality by improved coding efficiency.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure can be applied to an image encoding/decoding. When a current block to be encoded or decoded is predicted, the image encoding and decoding method according to the present disclosure can improve the accuracy of the prediction, which can provide an image with a satisfactory reproduction quality by improved coding efficiency.

The invention claimed is:

1. A video decoding method using intra prediction, the method comprising:

obtaining mode information of a current block from a bitstream;

selecting an intra prediction mode of the current block from a plurality of intra prediction modes based on the obtained mode information;

identifying a plurality of sub-blocks of the current block when the current block is divided into the plurality of sub-blocks; and reconstructing the plurality of sub-blocks based on respectively predicting the plurality of sub-blocks by using neighboring pixels adjacent to each of the plurality of sub-blocks, wherein each of the plurality of sub-blocks is predicted by using the same intra prediction mode of the current block selected based on the obtained mode information, wherein the reconstructing of the plurality of sub-blocks comprises:

predicting one of the plurality of sub-blocks;

reconstructing a residual sub-block corresponding to the predicted sub-block by decoding the bitstream; and adding the predicted sub-block to the reconstructed residual sub-block to thereby reconstruct the sub-block, wherein one or more pixels in the reconstructed sub-block are used as part of the neighboring pixels for predicting at least one non-reconstructed sub-block adjacent to the reconstructed sub-block.

2. The method of claim 1, wherein the neighboring pixels are located at a left side or an upper side of each of the plurality of sub-blocks.

3. The method of claim 1, wherein the neighboring pixels are pixels which have been already decoded and reconstructed.

* * * * *